United States Patent Office 3,356,504
Patented Dec. 5, 1967

3,356,504
GROWTH-PROMOTING COMPOSITIONS OF IMPROVED STABILITY
William L. Bender, Plainfield, and Nelson H. Ludwig, Franklin, Ind., assignors to Eli Lilly and Company, Indianapolis, Ind., a corporation of Indiana
No Drawing. Filed Sept. 19, 1963, Ser. No. 310,138
15 Claims. (Cl. 99—2)

This invention relates to improved growth-promoting compositions and to processes for the production thereof. More particularly this invention relates to improved growth-promoting compositions containing diethylstilbestrol.

The use of diethylstilbestrol as a growth-promoting substance has become commonplace in the raising of beef cattle and sheep. For this purpose, diethylstilbestrol is commonly administered to the animals orally as a component of their normal feed ration. Since the concentration of diethylstilbestrol required in the feed ration is extremely low, it is customary to supply the substance in the form of a relatively concentrated premix of diethylstilbestrol on an edible carrier. This premix is then blended with the desired feed ration to produce the supplemented ration.

Preparation of the premix can be accomplished by dry-mixing procedures wherein the dry diethylstilbestrol is mixed with a suitable inert dry carrier, and the diethylstilbestrol-carrier mixture is then blended with an edible carrier such as soybean meal or the like to give a premix suitable for blending with a feed ration. However, because of the importance of even distribution of the estrogenic material throughout the feed and the inherent difficulty of achieving such uniform distribution by dry-mixing procedures with the low levels of diethylstilbestrol employed, an alternative method is customarily employed, wherein the diethylstilbestrol is first dissolved in a natural vegetable triglyceride oil, and the oil solution of the estrogenic material is absorbed upon a finely divided vegetable material such as soybean meal, soybean feed, cottonseed meal, linseed meal, and the like.

Such premixes are in widespread use and have been thought to be adequate to achieve the desired results. Experience has shown, however, that under certain conditions of storage, considerable loss of potency occurs when such premixes are stored for extended periods of time. The reduced potency apparently results from a decomposition of the diethylstilbestrol, the exact nature of the said decomposition being unknown at the present time. Loss of potency is observed upon prolonged storage but is especially marked at elevated temperatures when the premix contains, in addition to the diethylstilbestrol, a high level of a mineral supplement such as is commonly supplied to animals. It is thus evident that, in these circumstances, the feed manufacturer cannot be certain of the diethylstilbestrol content of the particular lot of premix which is being employed. Accordingly, a diethylstilbestrol premix of improved stability would represent a significant advance in the art.

It is, therefore, a primary object of this invention to provide a diethylstilbestrol-containing premix having greatly improved stability under storage conditions. A further object of the invention is to provide such a premix which remains stable even in the presence of high levels of mineral supplements. Still another object is to provide a process for the production of a diethylstilbestrol premix of greatly improved stability. These and other objects of the invention will be better understood in the light of the ensuing description.

In accordance with the invention, it has now been found that diethylstilbestrol premixes with surprisingly improved stability result when a glycolic solvent vehicle is employed to distribute the diethylstilbestrol on the solid carrier. Among the most desirable glycols for this purpose are the mono- and poly-ethylene and propylene glycols. The glycols or polyglycols can be either solids or liquids at room temperature and can have molecular weights ranging up to about 20,000 or greater. For convenience in handling, it is preferred that the solid polyglycols have melting points not substantially exceeding 75° C. Because of its ready availability, lack of toxicity and desirable physical properties, an especially preferred solvent is propylene glycol.

In the practice of the invention, a solution of diethylstilbestrol in the desired glycol or polyglycol is prepared. The solvent may be heated to a temperature between about 80 and 125° C., if desired, in order to aid solution. The solution of diethylstilbestrol in the liquid solvent vehicle is then thoroughly mixed with a finely divided edible solid carrier material until the solution is absorbed by the solid carrier. In the case of the higher molecular weight polyglycols which are solid at room temperature, sufficient heat must, of course, be applied to maintain the polyglycol in its liquid state. A preferred procedure for the normally solid polyglycols comprises cooling the solution of diethylstilbestrol in the polyglycol until solidification occurs, grinding the diethylstilbestrol-polyglycol solid cake so obtained, and dry-mixing the ground material with the solid carrier. Among the solid carriers which can be advantageously employed are finely divided vegetable materials such as soya grits, soybean meal, soybean feed, cottonseed meal, linseed meal, alfalfa grits, alfalfa meal, wheat bran and the like. The vegetable materials which have an appreciable oil content are preferably solvent-extracted to render them substantially free of vegetable oils and highly absorbent for the solution containing the diethylstilbestrol.

A wide range of concentrations of diethylstilbestrol in the glycolic solvent vehicle may be employed in the practice of the invention. Thus, for example, solutions containing from 1 to 150 parts of diethylstilbestrol per 1000 parts of solvent may be employed in the preparation of the premixes. The concentration of the solutions employed will vary depending upon the particular solvent employed, the nature and the absorptive capacity of the solid carrier, and the final concentration of diethylstilbestrol desired in the premix. In general, concentrations of about 25 to 50 parts of diethylstilbestrol per 1000 parts of solvent vehicle are preferred.

Moderate heating of the diethylstilbestrol solutions is, in general, well tolerated. Thus, for example, the mixtures may be heated at temperatures ranging between about 80 and 125° C. for up to two hours to aid solution. However, temperatures above 125° C. and heating times in excess of two hours may result in a final product with inferior stability characteristics.

The greatly improved stability of the compositions provided by this invention has been demonstrated in laboratory and field tests with materials stored at both normal and elevated temperatures. Tables I and II below show the results of diethylstilbestrol potency determinations after eight weeks' storage of cattle feed compositions containing a high level of minerals. In the tables, potency is expressed as a percentage of the initial diethylstilbestrol content. The figures reported represent the averages of a number of assay determinations. It is apparent from the tables that the compositions of this invention exhibit improved stability characteristics at both normal and elevated temperatures with a variety of solid carrier materials.

TABLE I

[Diethylstilbestrol potency in feed premixes]

| Solvent Vehicle | Storage Temperature, °C. | Solid Carrier | | |
|---|---|---|---|---|
| | | Soya Grits | Alfalfa Grits | Soybean Meal |
| Soybean oil, refined | 25 | 40 | 45 | 24 |
| Vegefat a | 25 | 46 | 72 | 38 |
| Propylene glycol | 25 | 97 | 100 | 92 |
| Soybean oil, refined | 50 | 75 | 37 | 34 |
| Vegefat | 50 | 46 | 40 | 32 |
| Propylene glycol | 50 | 75 | 94 | 94 | a A vegetable oil methyl ester.

TABLE II

[Effect of solvent vehicle on diethylstilbestrol potency in feed premixes]

| Solvent | Carrier | Storage Temperature | | |
|---|---|---|---|---|
| | | 25° C. | 37° C. | 45-55° C. |
| Soybean oil, refined | Soybean feed | 26 | 20 | 10 |
| Vegefat a | Alfalfa granules | 66 | 65 | 48 |
| P-200 b | Soybean feed | 75 | | 70 |
| P-2000 c | Alfalfa granules | 82 | 85 | 64 |
| PEG 20M d | Soybean feed | 94 | | 37 |
| PEG 6000 e | Soybean feed | 93 | | 51 | a A vegetable oil methyl ester.
b Polypropylene glycol having an average molecular weight of about 200.
c Polypropylene glycol having an average molecular weight of about 2,000.
d Polyethylene glycol having an average molecular weight of about 20,000.
e Polyethylene glycol having an average meolcular weight of about 6,000.

The following non-limiting examples further illustrate the practice of the invention. Numerous variations coming within the spirit of the invention will be apparent to those skilled in the art.

*Example 1*

A steam-jacketed make-up tank is charged with about 440 liters of propylene glycol, the agitator is started, and live steam is admitted into the jacket. When the temperature of the propylene glycol reaches about 80° C., 11.25 kg. of diethylstilbestrol are added and stirring and heating are continued until solution results. Heating is discontinued and the diethylstilbestrol solution is added slowly to a mixer that has been charged with 4536 kg. of solvent-extracted soybean meal. After further mixing for about an hour, the premix is ready for bagging or for incorporation into a high-mineral feed supplement.

*Example 2*

A diethylstilbestrol-supplemented animal feed premix is prepared as in Example 1. To prepare a high-mineral feed supplement, 450 grams of the diethylstilbestrol premix is blended thoroughly in a mixer with 900 grams of urea, 2450 grams of calcium carbonate, 2000 grams of dicalcium phosphate, 3700 grams of sodium chloride, 50 grams of a vitamin premix containing vitamins A and $B_2$, 200 grams of an antibiotic premix containing aureomycin (known in the trade as Aurofac 10), and 250 grams of a trace mineral premix containing approximately 10 percent manganese, 0.3 percent iodine, 0.1 percent cobalt, 6 percent iron, 1 percent copper, 10 percent zinc, and 10 percent calcium. The high-mineral supplement so obtained is suitable for incorporation into a complete cattle feed ration at the rate of about 0.8 to 1 kg. of supplement per ton of complete feed.

*Example 3*

A heated make-up tank is charged with 64.356 kg. of PEG 6000 (a polyethylene glycol having an average molecular weight of about 6000) and heat is applied until the internal temperature reaches about 80° C. The agitator is started and 10.726 kg. of diethylstilbestrol are added. When solution is complete, the molten solution is discharged into shallow trays which are kept at room temperature until solidification occurs. The resulting solid cake is ground in a hammermill to a degree permitting the particles to pass through a 20-mesh sieve. The ground material comprising the diethylstilbestrol coated with PEG 6000 is mixed for about an hour in a vertical mixer with sufficient soybean feed to produce a total bath size of 10,500 pounds. When thoroughly blended, the premix is suitable for bagging or for incorporation into a high-mineral feed supplement or a complete feed ration.

*Example 4*

The procedure of Example 1 is followed employing P-2000 (a polypropylene glycol having an average molecular weight of about 2000) instead of propylene glycol. The resulting premix can be employed in the same way as the premix obtained in Example 1.

We claim:
1. A growth-promoting animal feed premix composition of improved stability prepared by mixing with an edible solid carrier material, a solution of diethylstilbestrol in a solvent selected from the group consisting of propylene glycol and a polypropylene glycol of molecular weight up to about 20,000, the ratio of diethylstilbestrol to solvent being about 1 to 150 parts of diethylstilbestrol to 1000 parts of solvent.
2. The composition of claim 1 to which has been added a high mineral feed supplement.
3. The composition of claim 1 in which the solvent is propylene glycol.
4. The composition of claim 1 in which the solvent is a polypropylene glycol having a molecular weight of about 20,000.
5. The composition of claim 3 in which the carrier material comprises solvent-extracted soya grits.
6. The composition of claim 3 in which the carrier material comprises solvent-extracted soybean meal.
7. The composition of claim 3 in which the carrier material comprises alfalfa grits.
8. The composition of claim 3 in which the carrier material comprises solvent-extracted soybean feed.
9. A process for producing a growth-promoting animal feed premix of improved stability which comprises preparing a solution of 1 to 150 parts of diethylstilbestrol in 1000 parts of a solvent selected from the group consisting of propylene glycol and a polypropylene glycol of molecular weight up to about 20,000, and mixing the said solution with an edible solid carrier material.
10. A process for producing a growth-promoting animal feed premix of improved stability which comprises preparing a solution of diethylstilbestrol in propylene glycol and mixing the said solution with an edible solid carrier material.
11. A process for producing a growth-promoting animal feed premix of improved stability which comprises preparing a solution of diethylstilbestrol in a polypropylene glycol having a molecular weight of about 2000, and mixing the said solution with an edible solid carrier material.
12. A process for producing a growth-promoting animal feed premix of improved stability which comprises preparing a solution of diethylstilbestrol in propylene glycol and mixing the said solution with solvent-extracted soya grits.
13. A process for producing a growth-promoting animal feed premix of improved stability which comprises preparing a solution of diethylstilbestrol in propylene glycol and mixing the said solution with solvent-extracted soybean meal.

14. A process for producing a growth-promoting animal feed premix of improved stability which comprises preparing a solution of diethylstilbestrol in propylene glycol and mixing the said solution with solvent-extracted soybean feed.

15. A process for producing a growth-promoting animal feed premix of improved stability which comprises preparing a solution of diethylstilbestrol in propylene glycol and mixing the said solution with alfalfa grits.

References Cited

UNITED STATES PATENTS

| 2,734,482 | 2/1956 | Seltzer. | |
|---|---|---|---|
| 2,751,303 | 6/1956 | Burroughs | 99—2 |
| 2,960,407 | 11/1960 | Gasner et al. | 99—2 |
| 3,042,525 | 7/1962 | Mattox | 99—2 |

A. LOUIS MONACELL, *Primary Examiner.*

D. DONOVAN, H. H. KLARE, *Assistant Examiners.*